March 15, 1966 A. D. SMITH 3,240,077
ELECTRIC APPLIANCE
Filed May 31, 1963 2 Sheets-Sheet 1
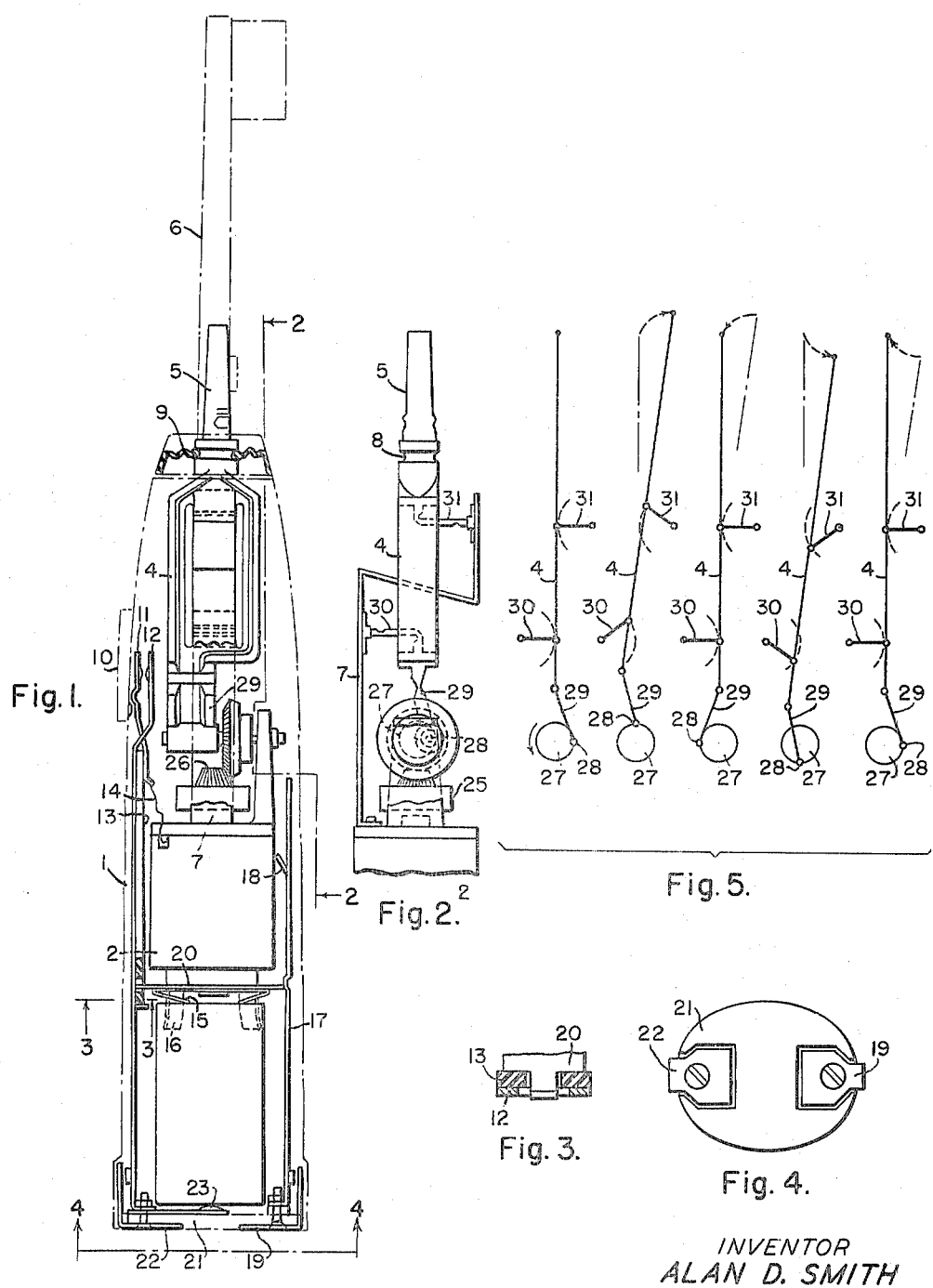
INVENTOR
ALAN D. SMITH
BY
ATTORNEY March 15, 1966  A. D. SMITH  3,240,077
ELECTRIC APPLIANCE
Filed May 31, 1963
2 Sheets-Sheet 2
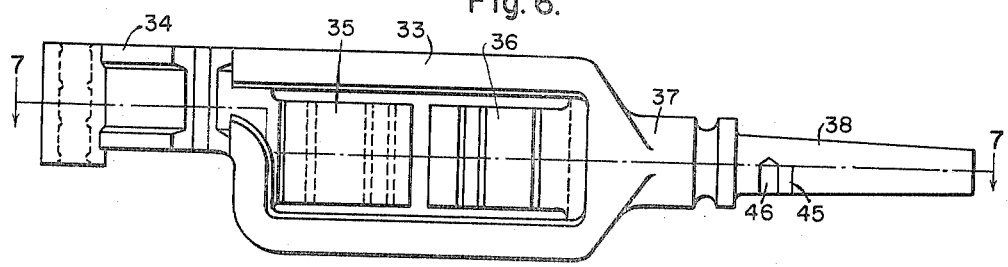
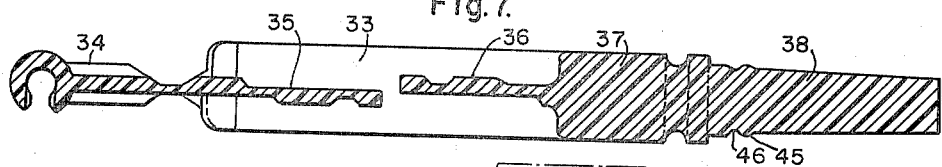
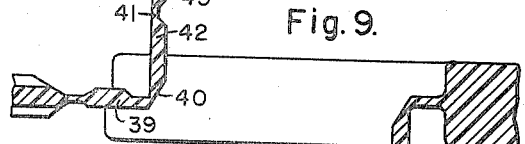
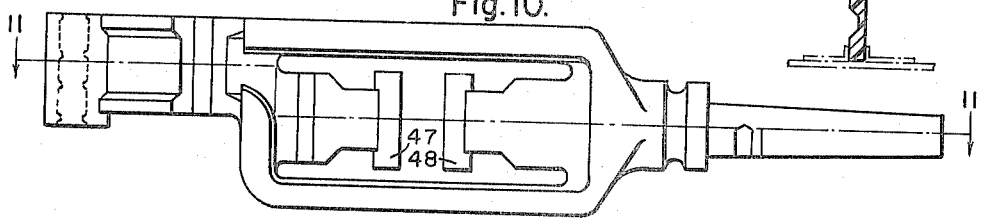
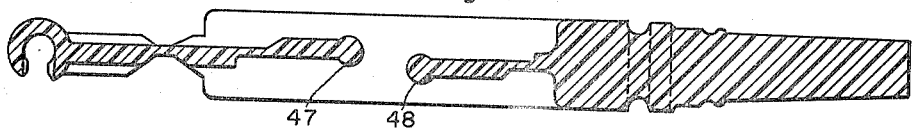
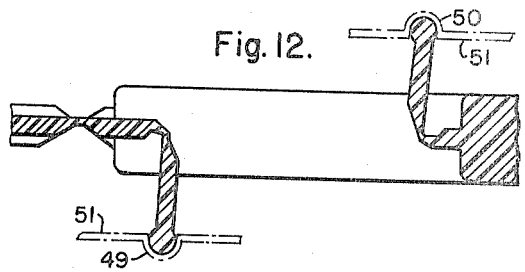
INVENTOR
ALAN D. SMITH
BY
ATTORNEY

United States Patent Office 3,240,077
Patented Mar. 15, 1966

3,240,077
ELECTRIC APPLIANCE
Alan D. Smith, Mansfield, Ohio, assignor to Westinghouse Electric Corporation, Pittsburgh, Pa., a corporation of Pennsylvania
Filed May 31, 1963, Ser. No. 284,612
9 Claims. (Cl. 74—43)

This invention relates to portable appliances and particularly to devices in which the means for producing a given movement is housed in a casing of the size, shape and weight to serve as a handle therefor such, by way of example, as a power driven toothbrush.

An object of the invention is to provide a means which will be quiet in operation, will be long lasting, difficult to stall, economical, and powerful enough to produce a superior result.

Another object of the invention is to provide a means to impart to an appliance, such as a toothbrush, a peculiarly suitable movement whereby the brushing of the teeth by the user will be efficient and not at all unpleasant.

In accordance with the present invention, an electrical motor and a battery are housed in a casing together with a frame having a shank protruding from the end thereof through a flexible apron which constitutes a stop to prevent the entrance of liquids or moist matter, such as toothpaste, into the casing, the casing being of a size and shape to constitute a handle. The said handle is provided with a switch placed at a position where the user's thumb may naturally operate it when the device is being used. A snap on handle for a toothbrush may be pushed onto the said shank and when the device is turned on the bristles of the toothbrush will move up and down and back and forth across the teeth in what may be described as a semicircular reciprocation.

A feature of the invention is the use of a lightweight, low inertia frame given a movement of reciprocation by the said motor and whose conventional straight line back and forth movement of reciprocation is modified by its supports into a substantially semicircular reciprocation. The frame is molded from a commercial plastic, polypropylene being preferred as a lightweight and very strong material. A plurality of hinges integral with the said frame are molded and then squeezed by conventional cold pressure means to provide flexibility at the hinge pintle points. A first of these hinges, so formed, extends backwardly from the body of the frame and has bearing means imbedded in its far end which will be cooperatively associated with a pin driven in a circular orbit by the said motor so that a back and forth movement is imparted to the frame, the said hinge bending at its said pintle point as though pivoted thereat. If the frame were confined in a slot then its movement would be a true reciprocation. However, the frame is secured at two points along its length by hinges, one extending out to one side and the other extending out to the other side, these said hinges being secured by their far ends to a stationary supporting means. Each of these hinges may be described as a compound hinge having three plates and two pintles whereby the frame may move back and forth but whereby the pintle point of each, substantially on the longitudinal axis of the frame, is confined to the arc of a circle about the other pintle and since the said two hinges are located on opposite sides of the frame the far end of the shank and the toothbrush or any other appliance snapped onto said shank will travel back and forth in a semicircular path. Thus, if the handle of the appliance is held horizontally the teeth will be brushed up and down and across in a natural manner. While the said hinges may be constructed in any other conventional manner without departing from the spirit of the invention the construction thereof by the cold pressure squeezing of the plastic along the lines representing the pintles is deemed an important feature since it gives highly satisfactory operation, is noiseless, economical and has a long life expectancy.

In an alternative form these compound hinges are constructed by pinching the flap which is molded integrally wth the frame so that part of the frame acts as the first plate of the hinge, the pinched portion acts as the first pintle and the part of the flap beyond this said pintle acts as the second or middle plate. Then the extreme end of this second plate is molded into cylindrical form to constitute the second pintle which will then move within the grasp of a cylindrical cooperating pintle bearing affixed to the supporting means. Thus in this type the third plate is not separate from the supporting means, but is actually part of the supporting means to which the pintle bearing is affixed. In the operation of such a hinge the said pintle molded integrally with the second plate of the hinge rotates back and forth in the said pintle bearing, it being noted that the thermoplastic material out of which it is molded provides excellent wearing qualities for such operation.

Another feature of the invention is the formation of the hinges by which the frame is secured to the supporting means by providing molded tabs as integral parts of the frame and then by forming pintle areas or lines by conventional cold pressure methods to squeeze the frame material to a desired thinness so that the outer part of said tab now constituting one plate of a hinge may move freely about the said formed pintle. While the invention is not restricted to the use of this type of hinge, still, for the sake of noiseless operation, small wear on the moving parts and little load on the motor (leaving most of the power thereof to be expended in the brushing of the teeth) this plastic frame with its integral hinges secured to a supporting means is preferred. In other words, the final semicircular reciprocation of the toothbrush may be obtained by conventional metallic parts in the frame and the hinges therefor so that this aspect of the invention is not restricted to the use of any particular type of material. The use of plastic material, however, has other advantages as hereinabove pointed out.

Another feature of the invention is the use of elastic means as a link between the handle of the device and the teeth of the user. The plastic frame onto which the toothbrush is snapped is somewhat elastic and of low mass so that the user will not be subjected to the rough treatment which a metallic linkage would afford whereby the use of such a device is pleasant and the danger of injury to the teeth or to the gums is avoided.

Other features will appear hereinafter.

The drawings consist of two sheets having twelve figures, as follows:

FIGURE 1 is a cross sectional view taken along the longitudinal axis of the power drive handle of the device;

FIG. 2 is a cross sectional view taken along the line II—II of FIG. 1;

FIG. 3 is a fragmentary cross section along the line III—III of FIG. 1;

FIG. 4 is an end view of the bottom closure of the power drive handle indicated by the line IV—IV of FIG. 1;

FIG. 5 is a group of diagrams showing how the shank end and the detachable toothbrush secured thereto is guided over a path which may be defined as a semicircular reciprocation;

FIG. 6 is a top view of that element which has been designated the frame and indicates this element constructed of a commercial thermoplastic before the hinge pintles have been formed by cold pressure;

FIG. 7 is a cross sectional view taken along line VII—VII of FIG. 6;

FIG. 8 is two fragmentary cross sectional views of the hinge pintles formed in the plastic body of the frame of FIG. 6 and corresponding to the left hand end of FIG. 7;

FIG. 9 is a fragmentary cross sectional view of part of the frame as shown in FIG. 7 indicating how the second compound hinge is bent upwardly with its middle hinge plate extending upwardly at right angles to the longitudinal axis of the frame with its third hinge plate secured to the supporting means of the device and how the third compound hinge is similarly disposed, but to the other side of the longitudinal axis of the frame;

FIG. 10 is a view similar to FIG. 6 but showing an alternative form of the frame in which the outer end of the compound hinges are formed as cylindrical pinties which will drop into pintle bearings formed in the supporting means whereby the supporting means, or part thereof, constitute the third hinge plates;

FIG. 11 is a figure similar to FIG. 7 showing the cylindrical pintles of the second and third compound hinges molded of the plastic from which the frame is constructed; and, FIG. 12 is a view similar to that of FIG. 9 showing how the cylindrical pintles of FIGS. 10 and 11 are dropped into cylindrical pintle bearings formed in the frame of the device.

The device of the present invention resides generally in a power drive handle 1 fashioned of plastic and indicated in outline and which houses a plurality of components such as an electrical motor 2, a battery 3, a frame 4 having a shank 5 protruding from its end onto which a detachable toothbrush 6 (indicated in outline) may be secured. A supporting means 7, spoken of as a Z frame, is shown in FIG. 2 as being secured to the motor 2.

At the bottom of the shank 5, a groove 8 formed therein accommodates a flexible apron 9 which constitutes a stop to prevent the entrance of liquids or moist matter, such as toothpaste, into this plurality of components housed therein.

The device is operated by the user pushing the slide, indicated in outline, to the right so that an electrical contact will be made between the metallic pieces 11 and 12. The contact part 11 is secured to a piece 13 of insulating material and extends through an aperture in the piece part 12. Contact piece 11 is connected by a wire 14 to one terminal of the motor 2 so that when contact is made between 11 and 12 the motor will go into operation. The circuit may be traced from the outside body of the battery 3 through springs 15 and 16 to the metallic frame piece 17, making contact by a tap 18 to the outside frame of the motor 2 as well as the charging contact 19. It is to be noted that the metal part 20, which is thus directly connected to one pole of the battery 3 does not make contact with the metal part 12 but is insulated therefrom by the insulation 13 as indicated in FIG. 3.

The bottom closure 21 for the housing supports the charging contacts 19 and 22, the latter being connected to the contact piece 23 provided to contact the centered live pole of the battery. Since the metal part 12 connects to the contact piece 23 and the charging contact 22, the circuit between the battery will be closed by the movement of the switch part 10 and the motor will go into operation.

The shaft of the motor will cause rotation of a flywheel 25 and a bevel gear 26. Another bevel gear 27 meshes with the gear 26 and thus causes a pin 28 to rotate in a circular path in a plane parallel to the longitudinal axis of the frame 4. The frame 4 is supported by a plurality of hinges, the first of which, 29, supports a bearing for the pin 28, so that as the gear 27 rotates the movement of the hinge 29 tends to substantially reciprocate the frame 4. If the frame 4 were supported in a slot then its movement would be a true reciprocation. However, the frame 4 is associated with the supporting means 7 by hinges 30 and 31 so that as it is moved back and forth by the first hinge 29 the reciprocation of the far end of the shank 5 will be translated into what may be termed a semicircular reciprocation.

This movement is shown in the diagrams of FIG. 5. It will be noted that the second pintle of each of the second and third hinges remains stationary so that as the gear 27 moves the pin 28 from its lowermost position about a quarter circle to its right hand position, the hinges 30 and 31 will move toward the right with the result that the far end of the shank will move outwardly and downwardly. Then as the pin 28 is rotated to its upper most position the hinges 30 and 31 are returned to their first position and the far end of the shank will retrace its first quarter movement. Following this the pin 28 will move to its furthest left hand position whereupon the hinges 30 and 31 will translate the leftward movement of the frame 4 and the far end of the shank 5 into an inward and downward movement. The last quarter rotation of the pin 28 will cause the far end of the shank to retrace this path so that the movement of the toothbrush is up and down and back and forth which may be called a semicircular reciprocation. The diagrams of FIG. 5 will make this clear.

FIGS. 6 to 12 show various aspects of the frame 4. This is constructed as a molded plastic piece and consists of a body 33 having molded integrally therewith a first hinge 34, a second hinge 35 and a third hinge 36 as well as a stem 37 and a shank 38. The far end of the first hinge 34 is fashioned so that a cylindrical piece may be snapped therein to act as a bearing to be cooperatively associated with the pin 28 carried by the bevel gear 27 hereinbefore described. It is to be noted that at the junction of the hinge 34 and the body 33 of the frame, the thickness of the hinge is reduced. Then, as clearly indicated in FIG. 8, this thickness is further reduced by conventional cold pressure means so that the hinge will freely bend at this point. Experience has proved that this virtual pintle is efficient and has a long life expectancy. The second and third hinges are likewise reduced by cold pressure methods. Such second and third hinges are what might be termed compound hinges having three plates and two pintles each. As indicated in FIG. 9, that part of the body 33 to which the hinge is attached, designated 39 in FIG. 9, constitutes a first hinge plate. Then there are the two pintles 40 and 41, and between these the second hinge plate 42. Beyond the pintle 41 a short piece 43 constitutes the third hinge plate which may be affixed to the supporting means 44.

The stem 37 is ringed by a groove into which a flexible apron may be fitted to act as a stop to prevent entrance into the power handle of liquids or moist matter, such as toothpaste.

The shank 38 has a unique cross section which makes it possible to attach a brush handle thereto in only a single position. This shank is provided with mound and dimple means 45 and 46 respectively which act to retain the said brush handle when it has been pushed down over the mound 45 as far as the taper of the shank will allow.

FIGS. 10, 11 and 12 show an alternative form of the device, one in which a pintle is molded directly onto the outer end of the second and third compound hinges. It has been found that the thermoplastic material, polypropylene of which this frame is molded has excellent wearing qualities and forms a superior pintle. Thus the molded pintles 47 and 48 may be dropped into cylindrical bearings 49 and 50 so that parts of the supporting means 51 in which such cylindrical bearing means are constructed constitute the third hinge plates of these compound hinges.

What is claimed is:

1. In a power driven device, a plurality of components including an electrical motor and a supporting means, a housing for said components having an open end provided with a flexible apron constituting a stop for preventing the entrance of liquids and moist matter into said housing, said plurality of components including a movable frame of molded plastic material having an elongated shank protruding through said apron, said frame being supported by a plurality of hinges consisting of hinge straps molded as integral parts of said frame and each having a line of decreased thickness to provide flexibility at the point of its attachment to said frame substantially constituting a pintle, one of said hinges having at its far end of its said strap a bearing operatively connected with a pin driven by said motor in a circular path in a plane parallel to the longitudinal axis of said frame for reciprocating said frame substantially along the longitudinal axis thereof and other of said hinges attached to said supporting means for translating the reciprocation of the far end of said shank into a substantially semicircular movement.

2. In a power driven device, a plurality of components including an electrical motor and a supporting means, a housing for said components having an open end provided with a flexible apron constituting a stop for preventing the entrance of liquids and moist matter into said housing, said plurality of components including a movable frame of molded plastic material having an elongated shank protruding through said apron, said frame being supported by a plurality of hinges consisting of hinge straps molded as integral parts of said frame and each having a decreased thickness to provide flexibility at the point of its attachment to said frame substantially constituting a pintle, one of said hinges having at the far end of its said strap a bearing operatively connected with a pin driven by said motor in a circular path in a plane parallel to the longitudinal axis of said frame and perpendicular to the said hinge pintles for reciprocating said frame substantially along the longitudinal axis thereof and other of said hinges attached to said supporting means for translating the reciprocation of the far end of said shank into a substantially semicircular movement.

3. In a power driven device, a plurality of components including an electrical motor and a supporting means, a housing for said components having an open end provided with a flexible apron constituting a stop for preventing the entrance of liquids and moist matter into said housing, said plurality of components including a movable frame of molded plastic material having an elongated shank protruding through said apron and shaped at its far end for cooperation with recessed snap on devices, said frame being supported by a plurality of hinges consisting of hinge straps molded as integral parts of said frame and each having a decreased thickness to provide flexibility at the point of its attachment to said frame substantially constituting a pintle, one of said hinges having at the far end of its said strap a bearing operatively connected with a pin driven by said motor in a circular path in a plane parallel to the longitudinal axis of said frame and perpendicular to the said hinge pintles for reciprocating said frame substantially along the longitudinal axis thereof and other of said hinges attached to said supporting means for translating the reciprocation of the far end of said shank into a substantially semicircular movement.

4. In a power driven device, a plurality of components including an electrical motor and a supporting means, a housing for said components having an open end provided with a flexible apron constituting a stop for preventing the entrance of liquids and moist matter into said housing, said plurality of components including a movable frame constructed of polypropylene having an elongated shank protruding through said apron and shaped at its far end for cooperation with recessed snap on devices, said frame being supported by a plurality of hinges consisting of hinge straps molded as integral parts of said frame and each having lines of decreased thickness to provide flexibility to substantially constitute pintle means, one of said hinges having at the far end of its said strap a bearing operatively connected with a pin driven by said motor in a circular path in a plane parallel to the longitudinal axis of said frame and perpendicular to the said hinge pintles for reciprocating said frame substantially along the longitudinal axis thereof and other of said hinges attached to said supporting means for translating the reciprocation of the far end of said shank into a substantially semicircular movement.

5. In a power driven device, a plurality of components including an electrical motor and a supporting means, a housing for said components having an open end provided with a flexible apron constituting a stop for preventing the entrance of liquids and moist matter into said housing, said plurality of components including a movable frame constructed of polypropylene having an elongated shank protruding through said apron and shaped at its far end for cooperation with recessed snap on devices, said frame being supported by a plurality of hinges consisting of hinge straps molded as integral parts of said frame and each having lines of decreased thickness to provide flexibility to substantially constitute pintle means, one of said hinges having at the far end of its said strap a bearing operatively connected with a pin driven by said motor in a circular path in a plane parallel to the longitudinal axis of said frame and perpendicular to the said hinge pintles for reciprocating said frame substantially along the longitudinal axis thereof and other of said hinges attached to said supporting means for translating the reciprocation of the far end of said shank into a substantially semicircular movement, said other hinges each having a flex line of reduced dimensions at each end of said hinge strap.

6. In a power driven device, a plurality of components including an electrical motor and a supporting means, a housing for said components having an open end provided with a flexible apron constituting a stop for preventing the entrance of liquids and moist matter into said housing, said plurality of components including a movable frame having an elongated shank protruding through said apron, said frame being supported by a plurality of hinges, a first of said hinges being located at the end of said frame opposite to said shank and having at its far end a bearing cooperatively connected with a pin driven by said motor in a circular path in a plane parallel to the longitudinal axis of said frame substantially along the longitudinal axis thereof, a second of said hinges extending from said frame at right angles to one side of said longitudinal axis, said second hinge being secured at its far end to said supporting means and a third of said hinges extending from said frame at right angles to the other side of said longitudinal axis, said third of said hinges being secured at its far end to said supporting means whereby the movement of reciprocation imparted to said frame by said first of said hinges is modified at the far end of said shank by said second and said third hinges to a substantially semicircular reciprocation.

7. In a power driven device, a plurality of components including an electrical motor and a supporting means, a housing for said components having an open end provided with a flexible apron constituting a stop for preventing the entrance of liquids and moist matter into said housing, said plurality of components including a movable frame having an elongated shank protruding through said apron, said frame being supported by a plurality of hinges, a first of said hinges being located at the end of said frame opposite to said shank, being a two plate hinge with a single pintle and having at its far end a bearing cooperatively connected with a pin driven by said motor in a circular path in a plane parallel to the longitudinal axis of said frame for reciprocating said frame substantially along the longitudinal axis thereof, a second of said hinges extending from said frame at right angles to one side of said longitudinal axis, said second hinge being a compound three plate hinge with a pintle at each edge of the second plate thereof and being secured by its third plate to said supporting means and a third of said hinges extending from said frame at right angles to the other side of said longitudinal axis, said third of said hinges being a compound three plate hinge with a pintle at each edge of the second plate thereof and being secured by its third plate to said supporting means whereby the movement of reciprocation imparted to said frame by said first of said hinges is modified at the far end of said shank by said second and said third hinges to a substantially semicircular reciprocation.

8. In a power driven device, a plurality of components including an electrical motor and a supporting means, a housing for said components having an open end provided with a flexible apron constituting a stop for preventing the entrance of liquids and moist matter into said housing, said plurality of components including a movable frame having an elongated shank protruding through said apron, said frame being supported by a plurality of hinges, a first of said hinges being located at the end of said frame opposite to said shank, being a two plate hinge with a single pintle and having at its far end a bearing cooperatively connected with a pin driven by said motor in a circular path in a plane parallel to the longitudinal axis of said frame for reciprocating said frame substantially along the longitudinal axis thereof, a second of said hinges extending from said frame at right angles to one side of said longitudinal axis, said second hinge being a compound hinge having two pintles, a first pintle being provided to allow a middle hinge plate to move in a short arc rotary movement with respect to said frame and a second pintle being provided to allow said middle hinge plate to move in a short arc rotary movement with respect to said supporting means, said second pintle being integrally molded at the outer end of said middle plate, a cylindrical pintle bearing for cooperative association with said second pintle being secured to said supporting means and a third of said hinges extending from said frame at right angles to the other side of said longitudinal axis, said third hinge being a duplicate in arrangement to said second hinge whereby the movement of reciprocation imparted to said frame by said first of said hinges is modified at the far end of said shank by said second and said third hinges to a substantially semicircular reciprocation.

9. In a power driven device, a plurality of components including an electrical motor and a supporting means, a housing for said components having an open end provided with a flexible apron constituting a stop for preventing the entrance of liquids and moist matter into said housing, said plurality of components including a movable frame having an elongated shank protruding through said apron, said frame being supported by a plurality of hinges, a first of said hinges being located at the end of the said frame opposite to said shank, said first of said hinges being formed integrally with said frame and having a compressed line formed thereacross to constitute a pintle, and having a bearing hole formed in its far end cooperatively connected with a pin driven by said motor in a circular path in a plane parallel to the longitudinal axis of said frame for reciprocating said frame substantially along the longitudinal axis thereof, a second of said hinges extending from said frame at right angles to one side of said longitudinal axis and a third of said hinges extending from said frame at right angles to the other side of said longitudinal axis, said second and third hinges each having a pintle located at the junction of said frame and a hinge plate thereof and each having a pintle formed integrally with said hinge plate at the far end thereof, cylindrical pintle bearings provided on said supporting means for receiving and holding said integrally formed pintles whereby the movement of reciprocation imparted to said frame by said first of said hinges is modified at the far end of said shank by said second and said third hinges to a substantially semicircular reciprocation.

References Cited by the Examiner
UNITED STATES PATENTS

| | | | |
|---|---|---|---|
| 470,233 | 3/1892 | Caldwell. | |
| 2,875,458 | 3/1959 | Tsuda | 74—42 X |
| 3,156,936 | 11/1964 | Hartman et al. | 74—49 X |
| 3,159,859 | 12/1964 | Rasmusen | 74—47 X |

BROUGHTON G. DURHAM, *Primary Examiner.*